United States Patent Office 3,406,077
Patented Oct. 15, 1968

3,406,077
FLUORIDATED FLOW CONDITIONER AND SALT COMPOSITIONS AND PROCESSES FOR PRODUCING SAME
Riyad R. Irani, St. Louis, Mo., assignor to Monsanto Company, St. Louis, Mo., a corporation of Delaware
No Drawing. Filed Dec. 31, 1964, Ser. No. 422,529
14 Claims. (Cl. 99—143)

ABSTRACT OF THE DISCLOSURE

Fluoridated flow conditioner compositions having a particle size smaller than about 100 microns and containing from about 0.1% to about 20% of a fluoride containing material selected from the group consisting of simple fluoride salts, complexing salts containing fluorides, water insoluble fluorine containing compounds and mixtures thereof. Sodium chloride compositions containing from 0.1% to about 20% of said fluoridated flow conditioner and dry processes for producing the beforementioned fluoridated flow conditioner.

---

This invention relates to an improved process for the manufacture of edible compositions. More particularly it relates to an improved process for introducing substances into edible compositions useful in the prevention of caries in teeth.

Prevention of tooth decay by the fluoridation of water is well known. In many countries and communities a central water supply does not exist; therefore, prevention of tooth decay by water fluoridation is not feasible in those areas. Similarly fluoridated toothpaste has a significant beneficial effect upon the prevention of tooth decay. However, in certain areas of the world due to factors, such as the habits, economics, availability of toothpaste, etc., proper dental hygiene through the use of toothpaste is not practical.

It is also known that individuals have a relatively constant intake of certain food substrate, such as salt. ("Salt" as used herein is sodium chloride or ordinary table salt unless otherwise specified.) It has also been shown that table salt with a fluorine content of from about 0.01 percent to about 0.03 percent by weight expressed as sodium fluoride has a significant beneficial effect upon tooth decay prevention.

Several problems exist in the introduction of these minute amounts of fluorine into the salt. For example, when the fluorine containing compound is admixed directly with the salt, the fluorine containing compound and the salt often segregate during handling and storage. Within a given large salt container, there can be portions free of fluoride ions (thus giving no beneficial fluorine effect when consumed) and other portions possibly can contain toxic amounts of fluorine. Under high humidity conditions, which are prevalent in many of the "underdeveloped" areas where dental care by fluoridated salt is most needed, the fluorine containing substances tend to leach to the bottom of the salt containers. Treating salt by spraying a water solution containing a fluorine bearing substance on a heated salt bed which is sufficiently hot to evaporate the water from the solution gives a uniformly fluoridated salt which is not subject to segregation or leaching. This process, however, has limitations. For example, the salt sometimes discolors upon heating. In addition, the fluorine containing substance must be water soluble and in many countries fluorapatite, a water insoluble fluorine bearing substance, is the most readily available fluorine containing material.

Other methods of providing fluoridated salt, such as drying a water soluble fluoride solution upon another additive, such as a flow conditioner, then mixing this additive containing the fluoride with the salt, solves the segregation and leaching problems. However, these processes are restricted to a water soluble fluorine bearing substance.

As can be appreciated, a process which enables the production of a fluoridated salt, which is not subject to fluorine segregation or leaching, and which enables either a water insoluble or a water soluble fluorine bearing substance in solid form to be used to supply the beneficial fluorine, would be a significant advancement in the art.

It is, therefore, an object of this invention to provide a process to produce a fluorine containing composition which can be mixed with ordinary table salt to form a fluoridated salt composition useful in the prevention of tooth decay.

It is another object of this invention to provide a process to produce a fluoridated product in which the fluorine does not segregate or excessively leach from portions of the product during handling or storage.

It is another object of this invention to provide a process to produce a fluoridated salt in which either a water insoluble or water soluble solid or a mixture of water soluble and water insoluble fluorine bearing material can be used to supply the beneficial fluorine.

It is still another object of this invention to provide a process to produce a fluorine bearing composition which can be mixed with salt to form an edible composition useful in the prevention of tooth decay.

It is a further object of this invention to provide an edible fluorine bearing composition comprising mainly salt useful in the prevention of tooth decay.

These and other additional objects of this invention will become apparent to those skilled in the art from the detailed description following.

It has been discovered that fluorine bearing materials in an extremely finely divided state can be coated with "conditioning" compounds which are also relatively finely divided to produce the valuable "fluoridated flow conditioner" of the present invention. The fluoridated flow conditioners of this invention comprise intimate mixtures of the fluorine containing substance and conventional flow conditioner, and do not separate into their individual components during handling and storage. Such fluoridated flow conditioners are useful when used to impart improved flow characteristics to edible compositions, such as salt, to thereby produce an edible composition valuable in the prevention of tooth decay.

An advantage of this invention is that both water soluble and water insoluble fluorine bearing compounds or mixtures thereof can be used to practice this invention. Examples of the water soluble fluorine containing compounds which can be used include the simple fluoride salts, such as the alkali metal fluorides, such as sodium, potassium and lithium fluorides; stannous fluoride, cupric fluoride, ammonium fluoride, iron fluoride; complex salts containing fluorine, such as ammonium fluorosilicate, lithium fluorosilicate, sodium fluorosilicate, and potassium fluorosilicate; as well as mixed halide salts such as stannous chlorofluoride, cupric chlorofluoride, iron chlorofluoride and the like.

In addition, the water insoluble fluorine containing compounds such as calcium fluoride, fluorapatite,

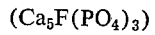

$$(Ca_5F(PO_4)_3)$$

magnesium fluoride, barium fluoride and mixtures thereof can be used to practice this invention. Mixtures of a water soluble fluoride salt, such as mentioned above and fluorapatite can be used in the practice of this invention.

In the practice of this invention, extremely finely divided flow conditioners and fluorine containing compounds are combined to make a fluoridated flow conditioner. The term "flow conditioner" as used herein refers to a substance, the particles of which are very finely divided, and when used to coat particles of other materials which tend to agglomerate, reduce the agglomeration tendency of the other material thus improving the flow characteristics and reducing the natural caking tendency of the material coated. For example, salt under high humidity conditions tends to agglomerate or cake, but when the salt is coated with a flow conditioning agent such as tricalcium phosphate, the agglomeration tendency of the salt is greatly reduced. In the practice of this invention, practically any of the useful conditioning agents can be used. Typical examples of suitable flow conditioners include the water insoluble phosphates such as tricalcium orthophosphate, calcium pyrophosphate, calcium tripolyphosphate, calcium disodium pyrophosphate, and magnesium disodium pyrophosphate as well as the aluminum silicates, such as sodium calcium aluminum silicate, potassium calcium aluminum silicate, and sodium magnesium aluminum silicate; calcium silicate hydrate; magnesium carbonate, calcium carbonate; silica aerogels; calcium sulfate and even common clays.

In the practice of this invention, it is necessary to prepare extremely minute particles of fluorine containing compounds in order for the fluorine bearing compound to be evenly dispersed throughout the conditioning agent and for the particles of the fluorine containing compound to be retained in a dispersed fashion throughout the resulting fluoridated flow conditioning agent. Although it is preferred in the practice of this invention that the average particle size of the fluorine containing compounds be between about 5 microns and 50 microns, while particles with an average particle size smaller than 10 microns and essentially 100% by weight smaller than 40 microns (as measured by micromesh screen) are especially preferred, larger particle sizes may be used. For example fluorine containing compounds with an average particle size of 30 microns with at most about 20 weight percent of their particles being between about 40 and about 50 microns can be used. Particles with an average particle size larger than 100 microns will not become uniformly coated and mixed with the conditioning agent and will tend to segregate by the agitation received during normal handling.

In the practice of this invention, the conditioner must also be relatively finely divided to give the proper coating to the particles of the material to be conditioned. Too large particles of conditioner will result in a fluoridated flow conditioner which will not uniformly coat the salt or other material and not effectively reduce the agglomeration tendency of the salt or other material to be conditioned. The conditioner tends to coat the fluorine containing substance, therefore the particles of the fluoridated flow conditioner of this invention are slightly larger than the particle size of the initial starting material. It is preferred to have flow conditioners which have an average particle size between about 1 and about 35 microns, while those materials having particles of about 10 microns size and essentially 100% by weight smaller than 40 microns as measured by micromesh screen are still further preferred. Suitable results, however, can be achieved with flow conditioners of a particle size smaller than a U.S. Standard 325 mesh screen or even which at most about 10 weight percent of their particles are as large as about 50 microns. In any event the fluoridated flow conditioner of this invention should have a particle size smaller than about 100 microns.

Any conventional means of crushing, grinding or pulverizing can be used to produce the proper particle size of the fluorine containing compound. For example, fluorapatite can be mined in the form of the relatively large chunks. These can be crushed in conventional gyratories, jaw crushers, hammer mills or roller mills to give an initial particle size reduction. Pulverizing, that is the reduction of the particles to about 100% smaller than a U.S. Standard 325 mesh screen and with an average particle size from about 10 to about 50 microns, can be done in conventional roller mills, ball mills and the like. The particular particle size reduction system used will vary depending upon the fluorine containing compound used to practice the invention. In any event the material to be used is to contain about 100 weight percent smaller than 100 microns. The methods of particle size reduction are given for clarity purposes only and are not intended to limit the scope of this invention.

Any conventional means of crushing, grinding or pulverizing to achieve size reduction may be used to prepare the proper particle size flow conditioning agent. The before mentioned methods in the preparation of the fluorine substance are suitable. It is likewise not intended to any way limit this invention to the method of achieving the desired particle size of flow conditioning agent, that is, essentially 100 weight percent of the flow conditioner passing through a U.S. Standard 325 mesh screen.

After the fluorine bearing compound is in the physical form of relatively small particle size, that is about 100 percent passing through a U.S. Standard 170 mesh screen and with an average particle size smaller than about 50 microns, it is intimately mixed with the relatively finely divided conditioner particles to form the fluoridated flow conditioner. Any conventional means of mixing may be used to practice this invention. For example, a double helical mixer consisting of two helical ribbons, one a right-hand screw and the other a left-hand screw, mounted inside a housing of suitable volume will give excellent results. The material is moved back and forth from one end of the mixer to the other, and also is lifted vertically to give a uniform mixing of the fluoride bearing compound with the particles of the conditioner.

Another form of agitation which can be used is the simple rotary drum consisting of a drum, mounted on a horizontal shaft and rotating with the shaft. The rotation of the drum causes the particles of the fluorine bearing compound and conditioner to be intimately mixed together by the tumbling action of the components within the drum.

Another form of mixer which can be used to give good mixing results is the ball mill. These mills contain a rotating shell and are charged with a grinding medium of a relatively hard material of construction. The grinding material is normally in form of balls, pebbles and the like. In addition to intimately mixing the components, the ball mill tends to grind the components thereby allowing materials with slightly larger than the desired particle size to be initially charged. A uniformly blended fluoridated flow conditioner of suitable particle size will be produced.

The time required to mix the components to give a composition of uniform fluorine content will be dependent upon several factors, such as the type of mixer used, the speed of rotation of rotating parts, the amount of conditioning agent to be fluoridated, the physical characteristics of the fluorine bearing component and the physical characteristics of the flow conditioner agent. In any event the components are to be intimately mixed so as to give a coating of flow conditioner on the fluorine containing compound and the fluorine containing compound is to be uniformly dispersed throughout the flow conditioner. It should be noted that the means of supplying mixing given herein are to more clearly explain the invention and are in no way intended to limit the scope of the invention.

The amount of fluorine containing compound used to fluoridate the flow conditioner will be dependent upon the amount of fluoridated flow conditioner that will be added to the material that is to be conditioned. Since it is generally preferred to use from about 0.1 weight percent to about 20 weight percent of the flow conditioning agent of the material flow conditioned, the generally preferred range of fluorine containing compound to the flow conditioning agent is from about 0.1 weight percent to about 20 weight percent of the fluorine containing compound in the fluoridated flow conditioner.

The fluoridated flow conditioner of this invention, that is the flow conditioner containing the specified concentration of fluorine, can be used in various edible compositions. Any edible solid of relatively small particle size which can be uniformly coated such as salt, spices, sugar and the like, can be used. The amount appropriate and type of flow conditioner for the particular end use desired and in turn the amount of fluorine in the flow conditioner can be varied to give the proper fluorine concentration and proper flow conditioning benefits. Since medical science has studied the human intake of salt comprehensively and the annual intake has been firmly established, salt is the preferred edible composition to be used to practice the invention. Any commercial table salt may be used. The particle size preferred is that about 100 weight percent will pass through a U.S. Standard 16 mesh screen and less than about 10 weight percent through a U.S. Standard 70 mesh screen. Salt having larger or smaller particle sizes can be used if desired. Any conventional means of intimately mixing the salt prior to use with the flow conditioner to give a uniform coating of the flow conditioner on the salt particles may be used. Suitable means of mixing include the double helical mixer and the rotary drum hereinbefore described. The invention is not intended to be limited in the method used in obtaining the intimate mixing of the fluoridated flow conditioner and the edible composition.

The following examples are given to illustrate the invention. All parts and percentages are by weight unless otherwise indicated.

Example I.—Preparation of fluorine containing compound

One hundred pounds of fluorapatite with an initial particle size of about 100% smaller than a U.S. Standard 60 mesh screen and about 100% larger than a U.S. Standard 325 mesh screen are charged into a conventional ball mill. After one hour the particle size of the fluorapatite is reduced to about 100% smaller than 40 microns and with an average particle size of about 10 microns as measured by micromesh screens.

Example II.—Preparation of fluoridated flow conditioner

Five hundred fifty pounds of tricalcium phosphate with about 100% smaller than 40 microns and with an average particle size of about 10 microns and 50 lbs. of fluorapatite $Ca_5F(PO_4)_3$, as prepared in Example I are charged into a double helical mixer. The helical screws are rotated at 150 revolutions per minute. The components are blended for about one hour. Nine samples are taken at 3 different horizontal points in the mixer bed and at 3 vertical levels in the mixer bed. All samples show a uniform concentration of about .3% fluorine in the mixer mass. The standard sodium nitrate titration is used to determine the fluorine content. After packaging the mixer contents into standard 20 gallon containers, the containers are subjected to vibration by moving the containers up and down for a distance of one-half inch in each direction at the rate of 30 times per minute for one hour. Analyses of samples of the flow conditioner taken at 3 different vertical levels inside the containers show the concentration remains at about 0.3% fluorine. Micromesh screen analysis of samples of the mixtures shows about 100% smaller than 50 microns.

Example III.—Conditioning salt

One thousand parts of table salt, about 100% passing through a U.S. Standard 16 mesh screen and about 5% passing through a U.S. Standard 70 mesh screen, and 22 parts of a fluorapatite-tricalcium phosphate composition prepared as in Example II are charged into a conventional ribbon mixer. The mixer is allowed to blend for 30 minutes. The resulting mixture has excellent flow properties. Upon being subjected to high humidity conditions, the fluorine content remains uniform at about .013% fluorine, expresesd as NaF, when analyzed by the standard procedure in Example II. Packages containing 1 pound of the mixture after being subjected to the vibration as given in Example II, show no tendency to segregate into the individual components as determined by the standard fluorine analysis. The resulting composition is substantially more resistant to caking under high humidity conditions than similar salt without the flow conditioner.

Example IV

One thousand parts of calcium pyrophosphate, about 100% smaller than 30 microns with an average particle size of 8 microns, and 10 parts of sodium fluoride, about 100% smaller than 40 microns and an average particle size of 30 microns are charged into a rotary drum rotating at 20 revolutions per minute. After mixing in the rotary drum for 30 minutes the sodium fluoride-calcium pyrophosphate mixture contains a uniform dispersion of sodium fluoride when samples are taken at random throughout the mixture in the drum. Flourine content is determined by the standard method given in Example II.

The above mixture imparts excellent flow and non-caking qualities to salt when used in amounts from about 1 to about 10%.

Other comparable fluoridated flow conditioning agents can be prepared in the same manner to give the proper fluorine content, as described above, by replacing sodium fluoride with substantially similar amounts of other alkali metal fluorides useful in the practice of this invention and in like manner other water insoluble phosphates can be substituted for calcium pyrophosphate. For example, potassium fluoride and lithium fluoride and mixtures thereof can be substituted for sodium fluoride in the foregoing composition and tricalcium orthophosphate, calcium tripolyphosphate, calcium disodium pyrophosphate and magnesium disodium pyrophosphate and mixtures thereof can be substituted for calcium pyrophosphate and the resulting fluoridated flow conditioning agent imparts excellent flow conditioning properties to salt and shows no tendency for the fluoride to segregate in the resulting composition.

Example V

One hundred twenty parts of fluorapatite, about 100% passing through a U.S. Standard 270 mesh screen and about 100% retained on a U.S. Standard 325 mesh screen and 780 parts of magnesium carbonate, about 100% passing through a U.S. Standard 325 mesh screen, are charged to a ball mill. After mixing for one hour the particle size of the resulting mixture is about 100% smaller than 50 microns with an average particle size of about 20 microns as measured by microscreens. Analyses of six samples taken at random at different locations within the ball mill show a uniform F content of about 0.4%.

One hundred parts of fluorapatite-magnesium carbonate mixture and 3000 parts of sodium chloride, about 100% passing through a U.S. Standard 16 mesh screen and about 5% passing through a U.S. Standard 70 mesh screen are charged to a conventional ribbon mixer. The components are allowed to blend for ½ hour. When the conditional salt is subjected to the vibration and analyses described in Example II, comparable non-caking and free flowing properties result. Analyses of samples taken at various locations within the mixture show a uniform fluorine content of about .01%. After being exposed to an atmosphere of high humidity, subsequent fluorine analysis shows no leaching of the fluoride compound to have occurred.

What is claimed is:

1. A process for making a dry fluoridated flow conditioning agent which process comprises (a) intermixing a fluorine-containing material selected from the group consisting of simple fluoride salts, complex salts containing fluorine, water insoluble fluorine containing compounds and mixtures thereof, and a flow conditioning agent for edible materials; said fluorine containing material constituting from about 0.1 percent by weight to about 20 percent by weight of the resulting mixture and said fluorine containing material consisting of particles smaller than about 100 microns; and said flow conditioning agent consisting of particles smaller than about 40 microns and constituting between about 80 percent by weight and 99.9 percent by weight of said resulting mixture; and (b) agitating said resulting mixture for a sufficient time to form a uniform blend of said fluorine containing material and said flow conditioning agent.

2. A process as in claim 1, wherein the average size of the particles of said flow conditioning agent is between about 1 and about 35 microns and the average size of the particles of said fluoride containing material is between about 5 and about 50 microns.

3. A process as in claim 2, wherein said flow conditioning agent is selected from the group consisting of tricalcium orthophosphate, calcium pyrophosphate, calcium tripolyphosphate, calcium disodium pyrophosphate, magnesium disodium pyrophosphate and mixtures thereof.

4. The process of claim 3, wherein the fluoride containing material is sodium fluoride.

5. A process as in claim 3, wherein said fluorine containing material is a water insoluble fluorine containing compound.

6. A process as in claim 5, wherein said fluorine containing compound is fluorapatite.

7. The process of claim 5, wherein said water insoluble fluorine containing compound is calcium fluoride.

8. A fluoridated flow conditioner composition for an edible composition consisting essentially of a uniform blend of fluorine containing compound and flow conditioning agent; said fluorine containing compound constituting between about 0.1 percent by weight and about 20 percent by weight of said fluoridated flow conditioner; said fluorine containing compound being coated with said flow conditioning agent and said fluoridated flow conditioner composition having a particle size smaller than 100 microns.

9. A fluoridated flow conditioner composition for an edible composition containing a uniform blend of water insoluble fluorine containing compound selected from the group consisting of simple fluoride salts, complex salts containing fluorine, and mixtures thereof and an inorganic calcium phosphate salt selected from the group consisting of tricalcium orthophosphate, calcium pyrophosphate, calcium tripolyphosphate, calcium disodium pyrophosphate, magnesium disodium pyrophosphate and mixtures thereof; said fluorine containing compound constituting between about 0.1 percent by weight and about 20 percent by weight of said fluoridated flow conditioner; said fluorine containing compound being coated with said flow conditioning agent and said fluoridated flow conditioner composition having a particle size smaller than 100 microns.

10. The composition of claim 9, wherein said inorganic calcium phosphate salt is calcium pyrophosphate.

11. A fluoridated flow conditioner composition containing a uniform blend of fluorapatite and a calcium phosphate salt selected from the group consisting of tricalcium orthophosphate, calcium pyrophosphate, calcium tripolyphosphate, calcium disodium pyrophosphate, magnesium disodium pyrophosphate and mixtures thereof; said fluorapatite constituting between about 0.1 percent and 20 percent by weight of said fluoridated flow conditioner and said fluoridated flow conditioner consisting of particles smaller than 100 microns and an average particle size smaller than about 40 microns, said fluorapatite being coated with said flow conditioning agent.

12. A fluoridated, flow conditioned salt composition comprising up to about 99.9 weight percent of sodium chloride and from about 0.1 to about 20 weight percent of said fluoridated flow conditioned salt composition of a fluoridated flow conditioner having particles smaller than 100 microns, said fluoridated flow conditioner being a uniform blend of a fluorine containing compound and a flow conditioning agent; said fluorine containing compound constituting between about 0.1 percent by weight and about 20 percent by weight of said fluoridated flow conditioner and said fluorine containing compound being coated with said flow conditioning agent.

13. The fluoridated flow conditioned sodium chloride composition of claim 12, wherein said fluorine containing compound is fluorapatite and the flow condition agent is tricalcium orthophosphate.

14. The fluoridated flow conditioned sodium chloride composition of claim 12, wherein said fluorine containing compound is calcium fluoride and the flow condition agent is tricalcium orthophosphate.

References Cited
UNITED STATES PATENTS 3,279,992  10/1966  Irani _____ 99—143 X

FOREIGN PATENTS 1,143,089  1/1963  Germany.

OTHER REFERENCES

Shaw, J. H., Cut Tooth Decay by Fluoride in Salt, Science News Letter, Apr. 23, 1955, p. 265.

ALVIN E. TANENHOLTZ, *Primary Examiner.*

D. M. NAFF, *Assistant Examiner.*